US009802116B2

(12) United States Patent
Balaban et al.

(10) Patent No.: US 9,802,116 B2
(45) Date of Patent: Oct. 31, 2017

(54) MACHINE LEARNING CONTROLLER FOR PRIZE DISPENSING ENTERTAINMENT MACHINES

(71) Applicants: Gary Balaban, Old Bridge, NJ (US); John Maurer, Whitehouse Stations, NJ (US); Greg Linder, Denver, CO (US)

(72) Inventors: Gary Balaban, Old Bridge, NJ (US); John Maurer, Whitehouse Stations, NJ (US); Greg Linder, Denver, CO (US)

(73) Assignee: Coast to Coast Entertainment LLC, Lakewood, NJ (US)

(*) Notice: Subject to any disclaimer, the term of this patent is extended or adjusted under 35 U.S.C. 154(b) by 0 days.

(21) Appl. No.: 14/853,917

(22) Filed: Sep. 14, 2015

(65) Prior Publication Data
US 2016/0023097 A1 Jan. 28, 2016

Related U.S. Application Data

(63) Continuation-in-part of application No. 13/849,500, filed on Mar. 23, 2013, now abandoned, and a (Continued)

(51) Int. Cl.
G08C 19/22 (2006.01)
A63F 9/30 (2006.01)
(Continued)

(52) U.S. Cl.
CPC ............ A63F 9/30 (2013.01); G06Q 40/12 (2013.12); G07F 17/3202 (2013.01);
(Continued)

(58) Field of Classification Search
None
See application file for complete search history.

(56) References Cited

U.S. PATENT DOCUMENTS

2007/0013139 A1* 1/2007 Kumagai .................. A63F 9/30 273/448
2007/0210523 A1* 9/2007 Verstraeten ............... A63F 9/30 273/447

FOREIGN PATENT DOCUMENTS

JP 2008099926 A * 5/2008
JP 2012029825 A * 2/2012

OTHER PUBLICATIONS

Wikipedia, Claw Crane, Nov. 5, 2012.*
(Continued)

Primary Examiner — Brian Zimmerman
Assistant Examiner — Kevin Lau
(74) Attorney, Agent, or Firm — White-Welker & Welker, LLC; Matthew T. Welker, Esq.

(57) ABSTRACT

A system to rapidly set up new claw machines for different styles of prizes, while also providing an excellent player experience through dynamically changing claw machine behavior through machine learning algorithms. These systems can be readily installed on most any crane machine by replacing the controller card. The system is configured by means of a control wand physically connected to the controller. Teaching the machine about the prize is accomplished by physically inserting a sample prize into the grabber, and executed a command via control wand to tell the machine to learn. Once configured and taught the prize, the machine is autonomous, and will maintain its programmed profit margin throughout the prizes dispensed by learning player behavior and making adjustments after each play.

4 Claims, 6 Drawing Sheets

Related U.S. Application Data continuation-in-part of application No. 13/358,915, filed on Jan. 26, 2012, now abandoned.

(60) Provisional application No. 61/614,706, filed on Mar. 23, 2012, provisional application No. 61/436,458, filed on Jan. 26, 2011.

(51) Int. Cl.
*G06Q 40/00* (2012.01)
*G07F 17/32* (2006.01)

(52) U.S. Cl.
CPC ...... *G07F 17/3223* (2013.01); *G07F 17/3225* (2013.01); *G07F 17/3232* (2013.01); *G07F 17/3234* (2013.01); *G07F 17/3297* (2013.01)

(56) References Cited

OTHER PUBLICATIONS

BMI Gaming, Winner Every Time Owners and Service Manual, Dec. 1, 2008.*
Panda Vending, Manual of Toy Crane Machines, Apr. 13, 2010.*

* cited by examiner

MACHINE LEARNING CONTROLLER FOR PRIZE DISPENSING ENTERTAINMENT MACHINES

CROSS REFERENCE TO RELATED APPLICATIONS

This application is a continuation in part (CIP) and claims priority from U.S. patent application Ser. No. 13/849,500, entitled "Game Machine Controller Method and PCB", filed on 23 Mar. 2013. The benefit under 35 USC §119(e) of the United States provisional application is hereby claimed, and the aforementioned application is hereby incorporated herein by reference.

U.S. patent application Ser. No. 13/849,500 application claims priority from U.S. Patent Application Ser. No. 61/614,706, entitled "Game Machine Controller Method and PCB", filed on 23 Mar. 2012. The benefit under 35 USC §119e of the United States provisional application is hereby claimed, and the aforementioned application is hereby incorporated herein by reference.

This application is a continuation in part (CIP) and claims priority from U.S. patent application Ser. No. 13/358,915, entitled "Game Machine Controller Method and PCB", filed on 26 Jan. 2012. The benefit under 35 USC §119(e) of the United States provisional application is hereby claimed, and the aforementioned application is hereby incorporated herein by reference.

U.S. patent application Ser. No. 13/358,915 claims priority from U.S. Patent Application Ser. No. 61/436,458, entitled "Crane Controller Method and PCB", filed on 26 Jan. 2011. The benefit under 35 USC §119(e) of the United States provisional application is hereby claimed, and the aforementioned application is hereby incorporated herein by reference.

FEDERALLY SPONSORED RESEARCH

Not Applicable

SEQUENCE LISTING OR PROGRAM

Not Applicable

TECHNICAL FIELD OF THE INVENTION

The present invention relates generally to game machines. More specifically, the present invention relates to game machines featuring an electronic circuit board controller to provide remote, wireless, machine monitoring.

BACKGROUND OF THE INVENTION

The present invention relates to the application of machine learning algorithms to skill-based entertainment machines, in particular to claw-style toy dispensing systems, hereby referred to as crane machines. Crane machines provide entertainment to players, chiefly through their ability to dispense toys under a combination of operator skill and machine capability. The general layout of such a crane machine is a collection of prizes to be dispensed which can be physically picked up by a claw or grabber attached to some style of multi-axis gantry. This multi-axis gantry is under direct player control, as is the grabber which can select the prize.

Most crane machines set the grabber pickup strength to change how difficult it is to grab the prizes, and therefore provide some degree of control over how many prizes the machine dispenses. All current crane machines employ a fixed setting or lookup table based approach to determine just how much force is applied to the grabber, based on time or number of toys dispensed. This provides a limited experience to the player, as well as providing difficulty in configuring the machines for different prize weights and sizes.

The present invention covers the means and methods to apply machine-based learning for a truly interactive crane game prize dispensing system, whereby the machine varies its grabber strength through a machine learning algorithm which operates internally on prize machine data, while outputting intelligently controlled and continuously variable power output to the grabber mechanism. In addition, the system described herein allows machine operators to quickly and automatically teach the machine new prize types, without needing to experience with settings and confusion. The combined effect is a much more enjoyable crane machine experience, with easier setup required by the operators.

The prior art in such crane machine technology includes several patents which go to great lengths to describe new technology applied to make crane machines smarter. Watanabe, in US20060170164A1, goes to great length to describe an RFID based means to alleviate the burden of the difficulty of adjusting the machine, which includes databases and readers and further technology. The embodiment discussed here also alleviates such burdens, but with data that already exists on most prize dispensing machines. Peck, in US20090191931A1, discloses several embodiments of a crane machine that includes options for interactive video, and presents "prizes, such as bonus time, that affect the subsequent attempt to obtain a prize". No mention is made of machine learning or the systems used to affect the subsequent attempts to obtain prizes.

The closest patent to what is described here is Stubben, U.S. Pat. No. 6,283,475 B1 which covers apparatus and method for crane game claw control. The closest claim is #36, which presents "A method of controlling a solenoid which controls gripping strength of a claw in a crane game machine comprising: selecting a desired gripping strength for the claw; creating an electrical signal representative of the desired gripping strength; and delivering and maintaining a current to the solenoid based on the signal". No means is mentioned which originates the gripping strength command.

SUMMARY OF THE INVENTION

The embodiment hereafter known as "the system" provides a means to rapidly set up new claw machines for different styles of prizes, while also providing an excellent player experience through dynamically changing claw machine behavior through machine learning algorithms. These systems can be readily installed on most any crane machine by replacing the controller card.

The system is configured by means of a control wand physically connected to the controller. Teaching the machine about the prize is accomplished by physically inserting a sample prize into the grabber, and executed a command via control wand to tell the machine to learn. Once configured and taught the prize, the machine is autonomous, and will maintain its programmed profit margin throughout the prizes dispensed by learning player behavior and making adjustments after each play.

BRIEF DESCRIPTION OF THE DRAWINGS

The accompanying drawings, which are incorporated herein an form a part of the specification, illustrate the present invention and, together with the description, further serve to explain the principles of the invention and to enable a person skilled in the pertinent art to make and use the invention.

DETAILED DESCRIPTION OF THE INVENTION

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the apparatus of the present invention.

Figure 1:
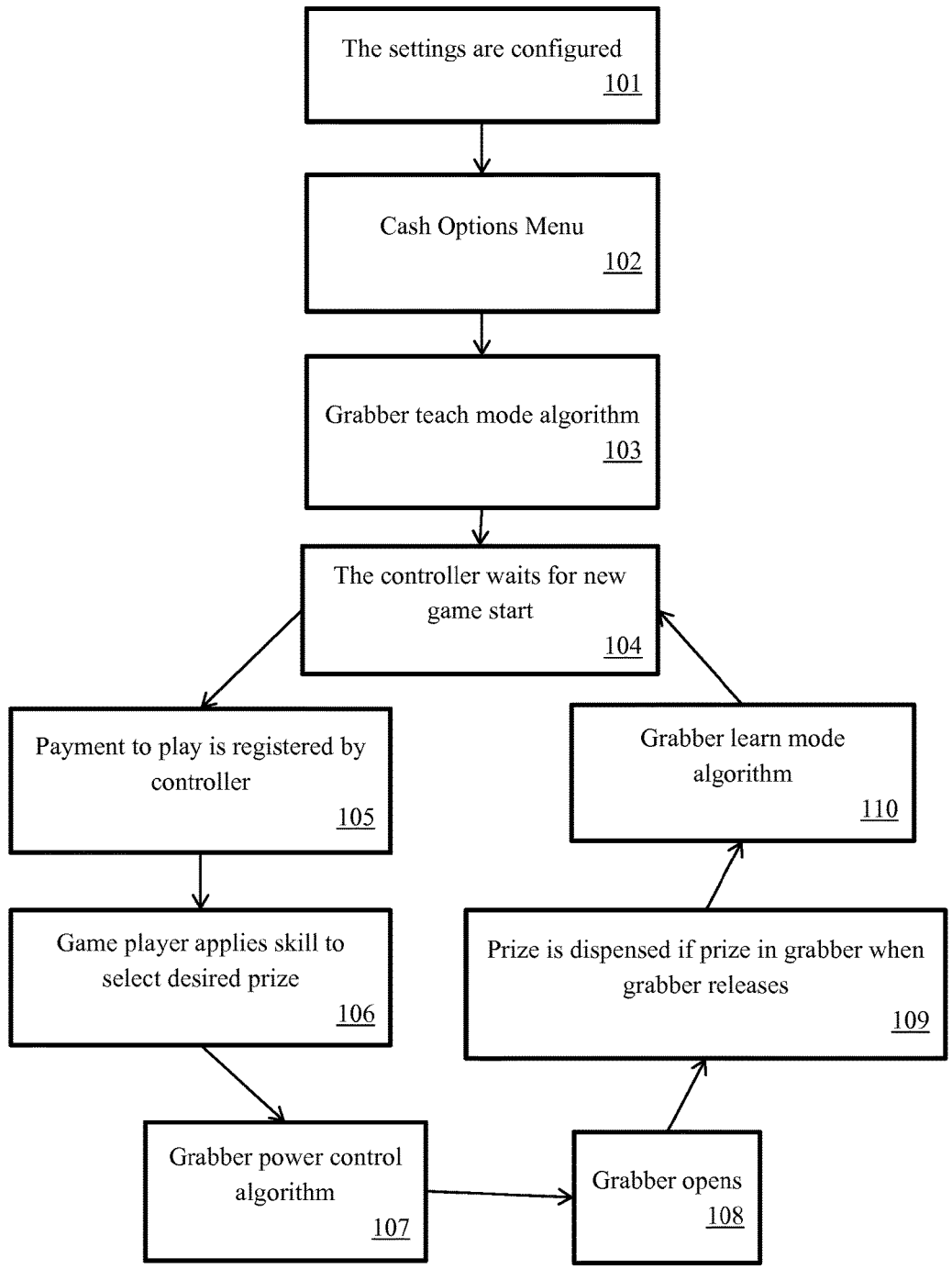
FIG. 1 illustrates setup mode and mode operation.
Figure 6:
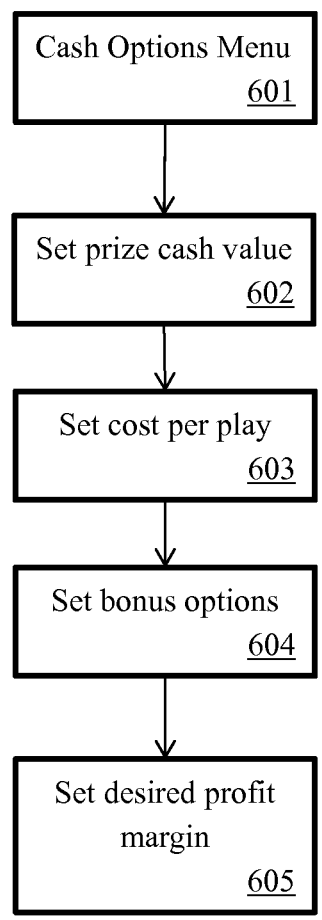
FIG. 6 illustrates the cash menu options needed by the control algorithms to operate the machine learning algorithms.

Device operation is divided into sections: the initial setup, and the playing of the machine As shown in FIG. 1, the operator first configures machine up for the toys to be dispensed 101, using options in the CASH OPTION MENU 102 FIG. 6 to tell the machine: Prize cash value; Cost per play of game; Bonus options and Desired profit margin.

Next, in FIG. 1, the operator teaches the machine about the prize to be dispensed. FIG. 6 illustrates the grabber power menu options, wherein the grabber options can be automatically set. Automatic setting is covered in FIG. 2, grabber teach, whereby: The grabber teach option is selected from the user interface. The toy is placed manually into the grabber, and teaching begins. The strength required to hold the toy is monitored by the machine. When the toy falls through the toy detector, machine stores how much force was recorded just before it dropped and the machine teaching is complete.

The process also determines the initial values of the machine learning algorithm, automatically populating the initial conditions for the control algorithm. Manual configuration is still possible via the manual configuration options of FIG. 5.

Figure 4:
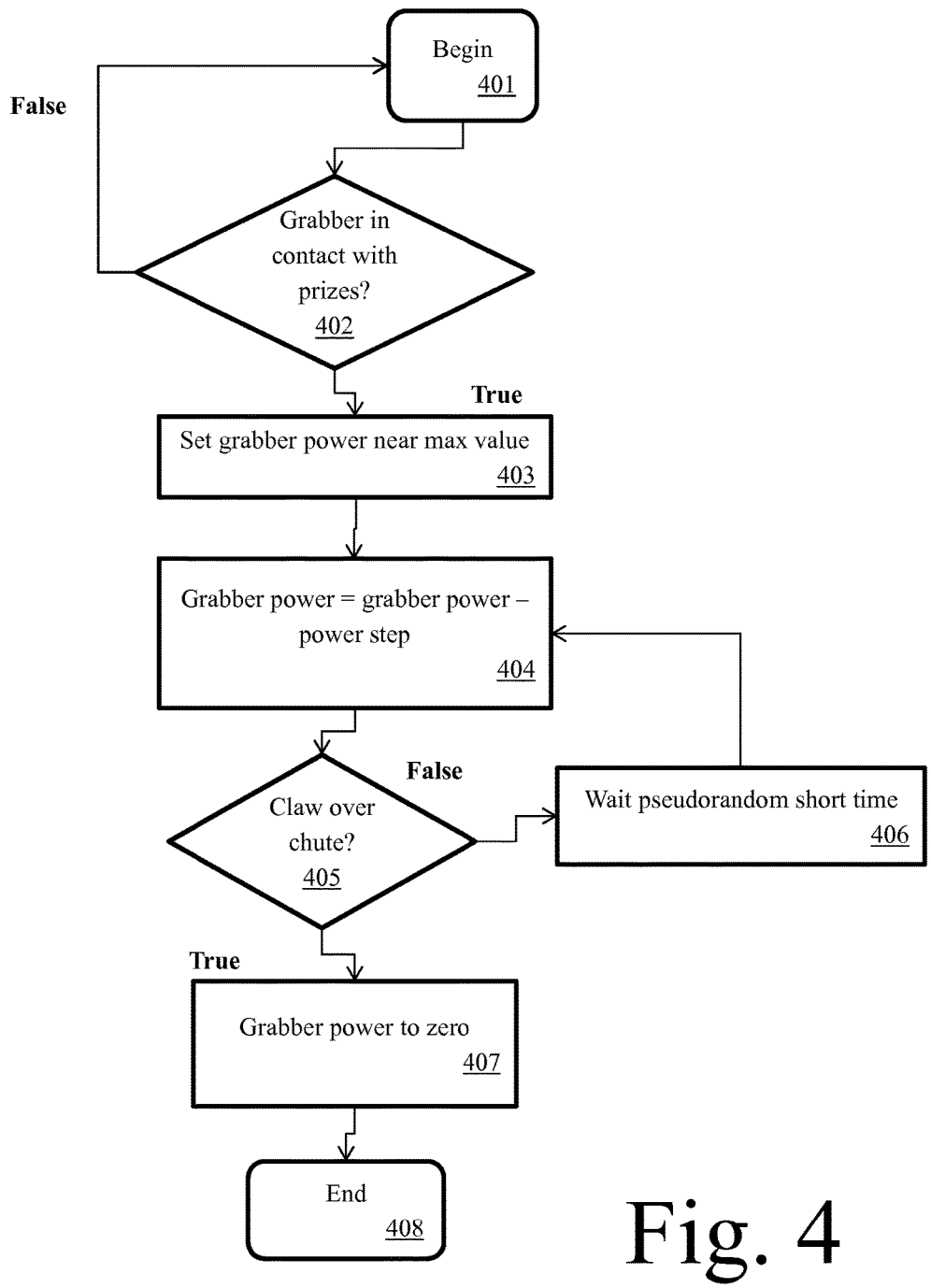
FIG. 4 illustrates the grabber power control algorithm, which uses the value derived from grabber learn to effect grabber behavior.

The machine is now configured. FIG. 1 waits for the new game to start 104, typically by insertion of payment means. Once payment is registered 105, the player uses their skill to position the grabber over the desired prize 106. Once the grabber is in physical contact with the prizes, the grabber power control algorithm 107 FIG. 4 is executed, whereby: The grabber opens 108 and then actuates with sufficient force to grab and hold prize; The grabber power ramps down by one power step; the algorithm waits a pseudorandom short interval; Steps 2 and 3 repeat until the claw is over the prize dispensing means; the grabber is released; and the prize, if still in the grabber when opened, falls by the prize detector 109.

Figure 2:
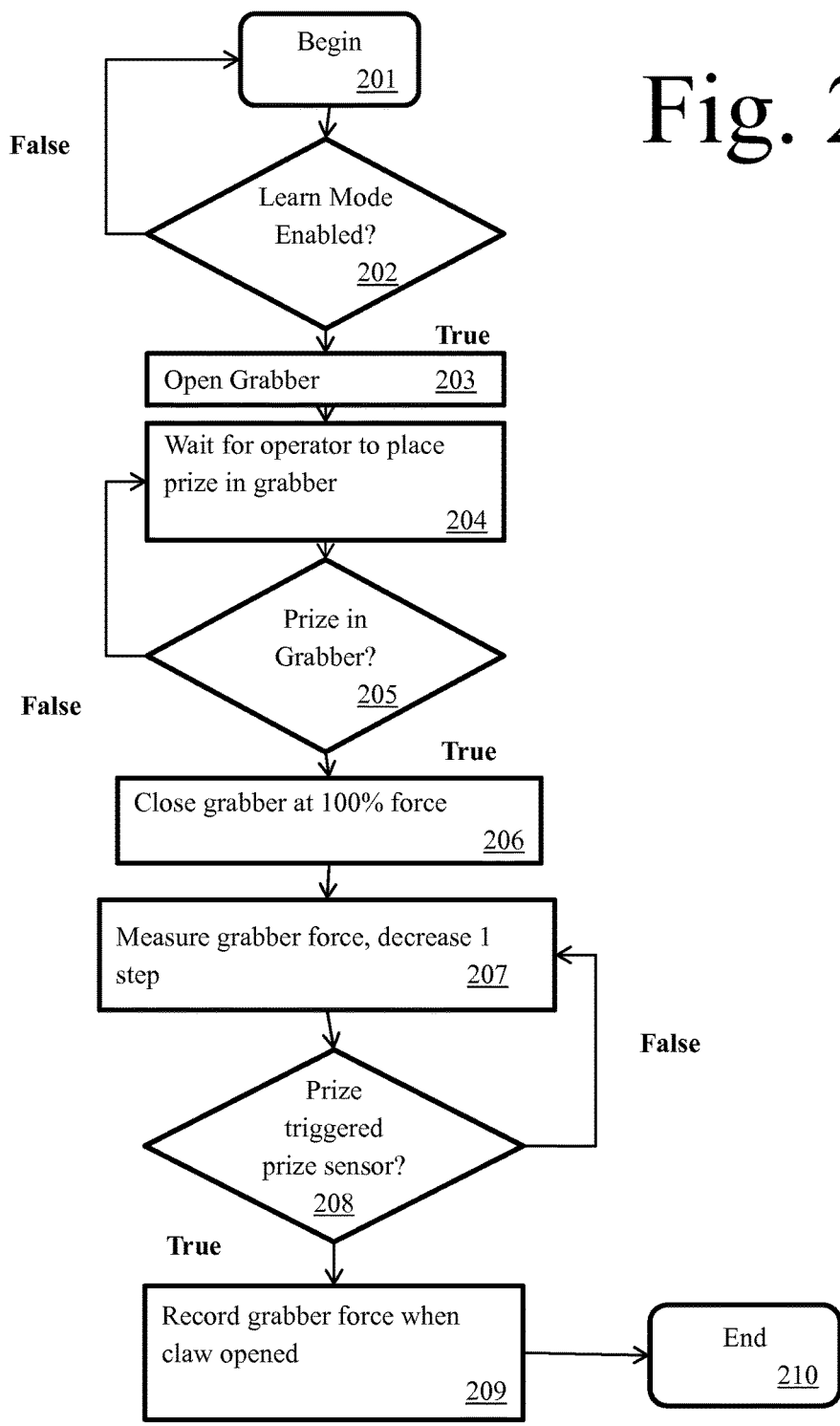
FIG. 2 illustrates the grabber teach algorithm used to teach the machine about the prize that it dispenses.

Now referring to FIG. 2, the automatic learning process is taught. The process begins 201 and the learning mode is enabled 202. The grabber opens 203 and waits for the operator to place the price grabber over the playing field 204. If there is a prize in the grabber 205, the grabber is closed with 100% force. The grabber force is measured and decreased by one step in step 207. If a prize is triggered by the prize sensor 208, the grabber force is again decreased by one step in step 207. The grabber force is recorded when the claw is opened 209 and the process ends 210.

Figure 3:
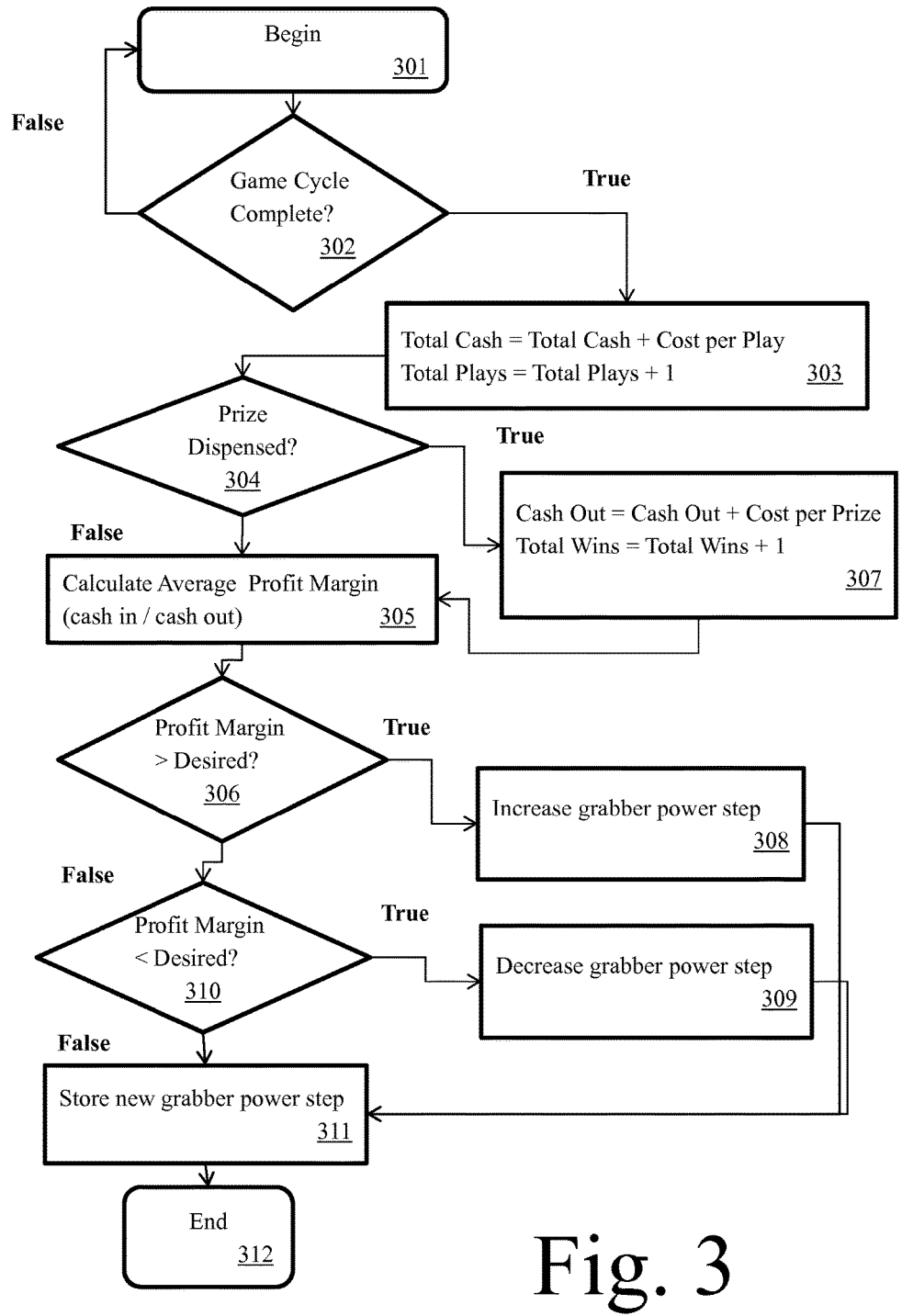
FIG. 3 illustrates the grabber learn algorithm applied once through each game cycle, that allows the system to learn player behavior.

After the player's game is complete 302, the controller moves on to grabber learn process 301 presented in FIG. 3. This algorithm is the internal machine learning algorithm which varies the players experience via its output variable, power step, used in FIG. 4. This algorithm performs the following steps: Increments total cash in the machine 303. Increments total plays by the machine. If a prize was dispensed 304, adds the prize value to the total cash out counter 307. The profit cumulative machine profit margin is calculated 305. If the profit margin is greater than the desired profit margin 306, the power step is increased 308, making the machine harder to win, as the grabber power will decrease faster. If the profit margin is less than the desired profit margin 310, the power step is decreased 309, making the machine easier to win, as the grabber power will decrease slower. If the profit margin is near the desired, then power step is unchanged in the next play. The grabber power step is stored for the next play 311 and the process ends 312.

Now referring to FIG. 4, the internal machine learning algorithm which varies the players experience via its output variable, power step is shown. The process begins 4-1 with first determining if the grabber is in contact with prizes 402. The grabber power is initially set near its maximum 403. The grabber power is calculated by grabber power less the power step 404. If the claw is over the chute 405, the grabber power goes to zero 407 and the process ends. If the grabber is not over the chute 405, the method waits for a pseudorandom short time 406 before repeating the grabber power level determination and checking to see if the claw is over the chute.

Figure 5:
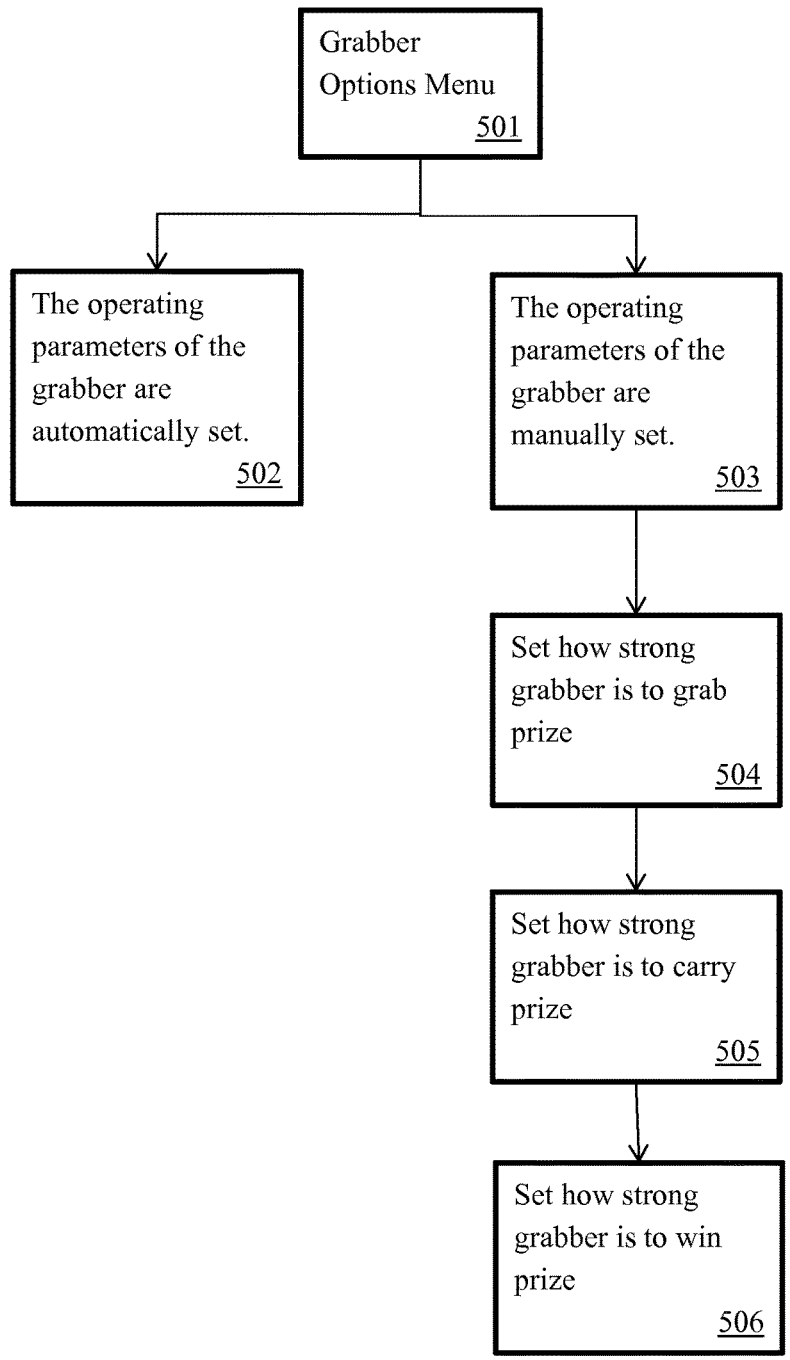
FIG. 5 illustrates the menu options relevant to the learn mode vs the manual configuration

FIG. 5 illustrates the grabber options menu 501, where the operating parameters of the grabber are either automatically set 502 or manually set 503. The grabber can be manually set to how strong the grabber is to grab a prize 504, how strong the grabber is to carry a prize 505, and how strong a grabber is to win a prize 506.

FIG. 6 illustrates the cash options menu 601, which contains the set prize cash value 6-2, set cost per play 603, set bonus options 604, and set desired profit margin 605.

With each new game cycle, the machine uses the above data points to derive a new claw power profile for the next time the claw is used. The electrical control circuit for the grabber then uses that data to vary the amount of strength on the claw in a quasi-random continuous fashion during game play. This provides a much more challenging and skill-intense player experience, while also providing the profit margin required by the game operators. The game operators do not know when the game machine will win, as the claw strength is controller and varied internally, and can be different on every play, based on the output data from the learning algorithm.

In addition, as the toys are dispensed from the machine, the machine will change its settings automatically to maintain the desired profit margin. This allows a consistent player experience when the machine is new, and full, as well as when it is nearly empty, providing an exciting customer experience.

Thus, it is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents, rather than by the examples given.

The embodiments of the invention in which an exclusive property or privilege is claimed are defined as follows:

1. A machine learning controller for a machine, comprising:
   teaching the machine learning controller about a prize to be dispensed;
     a grabber teach option is selected from a user interface;
     a desired toy is placed manually into a grabber, and teaching begins;
     a strength required to hold a toy is monitored by the machine;
     the strength required to hold the desired toy is based on a measured force sufficient to hold the desired toy;
     when the desired toy falls through a toy detector, the machine stores how much force was recorded just before it dropped; and
     one or more measurements from the toy detector are used to control one or more operator parameters of the machine;
   a machine learning algorithm, automatically populating one or more initial values for a control algorithm; and
   as a prize toy is dispensed from the machine, the machine will change its settings automatically to maintain a desired profit margin;
   the machine is now configured;
   the machine waits for a new game to start, by insertion of payment means;
   once payment is registered, a new game starts and the grabber is positioned over the desired prizes;
   once the grabber is in physical contact with the desired prize toys, a grabber power control algorithm is executed;
   the grabber power control algorithm is executed according to the following steps, resulting in a ramp rate of the holding force being decreased under the control of an internal control system controlling game difficulty by controlling a change of value of force with regards to time, rather than the force itself, in a continuous manner, effectively varying a time required to ramp from a full strength to a weaker strength;
     a. the grabber actuates with sufficient force to grab and hold the prize toy;
     b. the grabber force ramps down by one power step;
     c. the grabber power control algorithm waits a pseudorandom short interval;
     d. steps b and c repeat until the grabber is over a prize dispensing means;
     e. the grabber is released; and
     f. the desired prize toy, if still in the grabber when opened, falls by a prize detector.

2. The machine learning controller of claim 1, wherein
   after a new game is complete, the controller moves on to a grabber learn algorithm; and
   the grabber learn algorithm is an internal machine learning algorithm which varies a machines output variable, force step.

3. The machine learning controller of claim 2, wherein
   the internal machine learning algorithm performs the following steps:
     increments total cash in the machine;
     increments total plays by the machine;
     if a prize toy was dispensed, adds a prize value to the total cash out counter;
     a profit cumulative machine profit margin is calculated;
     if the cumulative machine profit margin is greater than the desired profit margin, the force step is increased, making the machine harder to win, as a grabber power will decrease faster;
     if the cumulative machine profit margin is less than the desired profit margin, the force step is decreased, making the machine easier to win, as the grabber power will decrease slower;
     if the cumulative machine profit margin is near the desired profit margin, then force step is unchanged in a next new game;
     the grabber force step is stored for the next new game.

4. The machine learning controller of claim 3, wherein
   with each new game, the machine uses the cumulative machine profit margin and the desired profit margin to derive a new grabber power profile for the next new game;
   an electrical control circuit for the grabber then uses that data to vary the amount of force on the grabber in a quasi-random continuous fashion during game play.

* * * * *